(12) United States Patent
Kuvettu et al.

(10) Patent No.: US 8,932,712 B2
(45) Date of Patent: Jan. 13, 2015

(54) METAL PASSIVATOR ADDITIVE AND PROCESS FOR PREPARING

(75) Inventors: Mohan Prabhu Kuvettu, Faridabad (IN); Manish Agarwal, Faridabad (IN); Arumugam Velayutham Karthikeyani, Faridabad (IN); Balaiah Swamy, Faridabad (IN); Biswanath Sarkar, Faridabad (IN); Mitra Bhanu Patel, Faridabad (IN); Santanam Rajagopal, Faridabad (IN)

(73) Assignee: Indian Oil Corporation Limited, Faridabad (IN)

( * ) Notice: Subject to any disclaimer, the term of this patent is extended or adjusted under 35 U.S.C. 154(b) by 0 days.

(21) Appl. No.: 13/702,545

(22) PCT Filed: Jun. 1, 2011

(86) PCT No.: PCT/IN2011/000373
§ 371 (c)(1),
(2), (4) Date: Dec. 6, 2012

(87) PCT Pub. No.: WO2011/154973
PCT Pub. Date: Dec. 15, 2011

(65) Prior Publication Data
US 2013/0078468 A1 Mar. 28, 2013

(30) Foreign Application Priority Data
Jun. 7, 2010 (IN) .......................... 1317/DEL/2010

(51) Int. Cl.
B32B 5/16 (2006.01)

(52) U.S. Cl.
USPC ............. 428/402; 427/212; 977/773; 502/60; 502/64; 502/68; 502/71; 502/77; 502/78; 502/232

(58) Field of Classification Search
USPC ....... 428/402; 427/212; 977/773; 502/60, 64, 502/68, 71, 77, 78, 232
See application file for complete search history.

(56) References Cited

U.S. PATENT DOCUMENTS

| | | |
|---|---|---|
| 3,930,987 A | 1/1976 | Grand |
| 4,111,845 A | 9/1978 | McKay |
| 4,153,536 A | 5/1979 | McKay |
| 4,257,919 A | 3/1981 | Roberts et al. |
| 4,359,379 A | 11/1982 | Ushio et al. |
| 4,515,683 A | 5/1985 | Beck et al. |
| 4,562,167 A | 12/1985 | Bertus et al. |
| 4,929,583 A | 5/1990 | Pasek et al. |
| 4,938,863 A | 7/1990 | Degnan et al. |
| 5,057,205 A | 10/1991 | Chin et al. |
| 5,071,806 A | 12/1991 | Pecoraro |
| 5,173,174 A | 12/1992 | Upson et al. |
| 5,304,299 A | 4/1994 | Kumar |
| 5,384,041 A | 1/1995 | Deeba et al. |
| 5,520,797 A | 5/1996 | Ino et al. |
| 5,603,823 A | 2/1997 | Kim |
| 5,965,474 A | 10/1999 | Balko et al. |
| 5,993,645 A | 11/1999 | Madon et al. |
| 6,355,591 B1 * | 3/2002 | Kuvettu et al. ................. 502/68 |
| 6,673,235 B2 | 1/2004 | Harris et al. |
| 6,723,228 B2 | 4/2004 | Su et al. |
| 2007/0209969 A1 | 9/2007 | Shen et al. |

FOREIGN PATENT DOCUMENTS

| | | |
|---|---|---|
| EP | 0 350 280 A1 | 1/1990 |
| EP | 0 568 170 A1 | 11/1993 |
| EP | 0568170 * | 11/1993 |
| EP | 0350280 * | 1/1999 |
| WO | 2005/040311 A1 | 5/2005 |
| WO | WO2005/040311 * | 5/2005 |

* cited by examiner

*Primary Examiner* — Leszek Kiliman

(74) *Attorney, Agent, or Firm* — Maschoff Brennan

(57) ABSTRACT

The present invention relates a metal passivator additive comprising: a rare earth component; alumina; clay; colloidal silica; and a zeolite having high silica to alumina ratio. The present invention also relates to a process for preparing a metal passivator additive, said process comprising: preparing a rare earth slurry by mixing rare earth component with water; obtaining an alumina gel by treating alumina slurry with an acid, wherein the alumina slurry is prepared by mixing alumina and water; mixing the alumina gel and the rare earth slurry to obtain a slurry mixture; adding a colloidal silica to the slurry mixture; preparing a clay slurry by mixing clay and a dispersant; combining the clay slurry and the slurry mixture to obtain a rare earth-binder-filler slurry; obtaining an additive precursor slurry by mixing a zeolite having high silica to alumina ratio to the rare earth-binder-filler slurry; spray-drying the additive precursor slurry to obtain a spray-dried product; and calcining the spray-dried product to obtain the metal passivator additive.

15 Claims, No Drawings

METAL PASSIVATOR ADDITIVE AND PROCESS FOR PREPARING

FIELD OF INVENTION

The present invention relates to a metal passivator additive. The present invention also relates to a process for preparing the metal passivator additive.

The metal passivator of the present invention is an effective metal passivator additive, which can effectively passivate the metals and compensate for the dilution.

BACKGROUND

FCC catalysts used today in cracking process for heavy oils are among the most sophisticated catalysts, having high selectivity towards gasoline range products due to the presence of large pore faujasite type zeolite in various compositions. Increasing cost of crude is forcing refineries to process opportunity feeds having high carbon residue, nitrogen, aromatics and contaminants such as nickel and vanadium for maintaining decent returns on investment. Of all the contaminants present in feeds, metal contaminants pose the greatest challenge, as some of them permanently cripple the catalytic activity. Nickel and vanadium are the most prominent among all the metals requiring remedy for their undesired properties. Nickel is well known for dehydrogenation of feed and products under normal FCC operation conditions thereby producing higher coke and dry gas. These effects are predominant with catalysts having higher surface area. Vanadium, unlike nickel, is known for zeolite destroying property and for even worse effects by hopping from aged catalyst particle to fresh catalyst particle while carrying out the destructive action. Vanadium pentoxide, formed during severe regeneration operation, gets converted to vanadic acid which reacts with structural alumina of zeolite and also with structure supporting rare earth species. Thus, presence of vanadium in the feed can permanently reduce activity of the FCC catalyst. Processing such feeds demand catalysts having higher metal tolerance, and mesoporous active matrix. Formulations designed for processing of heavy feeds are known as Resid Fluid Catalytic Cracking (RFCC) catalyst. Such feeds sourced from streams such as light oil, inter oil, heavy oil, deashphalted oil, short residue, heavy gas oil, coker gasoil having nickel and vanadium in the respective range 2-50 ppm and 5-120 ppm enrich the catalyst with total metals from 1-3 wt %. As discussed earlier, presence of vanadium metal on catalyst will permanently destroy catalytic activity while nickel contributes towards higher dry gas along with coke. In order to maintain good activity, catalyst make-up rate is higher while processing metal rich feeds.

For taking care of higher metals while processing metal laden feeds, catalyst manufacturers employ higher concentration of hydrothermally stable REUSY zeolite in range 40-50 wt % along with inbuilt metal passivator component bonded by customized mesoporous matrix. Such catalysts suffer from flexibility in usage, as processing of lighter feeds does not need complex compositions and high value ingredients. Even, if softer normal FCC catalysts are added to top-up, major chunk is still a low active RFCC catalyst.

Several types of additives were introduced in late eighties to overcome limitations in conventional FCC/RFCC as wholesome catalysts. Such additives offered flexibility of addition and termination whenever special effects are desired. Metal passivator is one of such additives. Following are some of most prominent prior art formulations/products which were claimed to be effective for passivation of nickel and vanadium.

U.S. Pat. No. 3,930,987 describe zeolite containing cracking catalysts, which are impregnated with a solution of rare earth salts on matrix. This particular process was developed with an intention of enhancing of efficacy of zeolite in catalytic activity.

For overcoming destructive properties of vanadium and coke forming tendencies of nickel in FCC catalysts, several passivation solutions were discussed in U.S. Pat. Nos. 4,111,845, 4,153,536 and U.S. Pat. No. 4,257,919, which were based on antimony, indium or bismuth.

U.S. Pat. No. 4,515,683 discloses a method for passivating vanadium on catalytic cracking catalysts wherein lanthanum is nonionically precipitated on the catalyst prior to ordinary use; however the refiner has no control on content of metal passivator component as it is an integral part of the main cracking catalyst.

Besides solid metal passivators, there are a number of disclosures on applications of liquid metal passivators. U.S. Pat. No. 4,562,167 refer to liquid metal passivator solution containing Sb and Sn compounds.

U.S. Pat. No. 4,929,583 refers to a process for the catalytic cracking of a vanadium-containing hydrocarbon charge stock by contacting the feed with a catalyst having a weak anion component selected from $SrCO_3$, $SrTiO_3$, $BaCO_3$, $Ce_2(CO_3)_3$ etc.

U.S. Pat. No. 4,938,863 describes a process for making a metal tolerant catalyst with a zeolite in an alumina-free binder or coating, preferably silica, with a vanadium getter additive.

U.S. Pat. No. 5,057,205 refers to a process with an additive for catalytic cracking of high metal content feeds including residues. The catalyst additive comprises of an alkaline earth metal oxide and an alkaline earth metal spinel, preferably a magnesium aluminate spinel.

U.S. Pat. No. 5,071,806 discloses a composition for the catalytic cracking of feeds with high metals, the catalyst comprising a magnesium-containing clay material, a silica-alumina cogel, and zeolite.

U.S. Pat. No. 5,173,174 describes a catalyst matrix comprising bastnaesite and a limited quantity of a large pore boehmite alumina for reducing harmful effects of nickel and vanadium on catalyst activity and selectivity.

U.S. Pat. No. 5,304,299 discloses a catalytic cracking catalyst combined with a rare earth, preferably lanthanum-containing catalyst/additive to enhance the cracking activity and selectivity in the presence of nickel and vanadium (Ni and V). The preferred additives comprise of lanthanum, neodymium oxide and/or oxychloride dispersed in a clay/alumina matrix, wherein the alumina is derived from an aluminum hydroxychloride sol. It may be noted that application of aluminum hydroxychloride as binder containing about 17-wt % chlorine, needs additional process while manufacturing such binder-based additive.

U.S. Pat. No. 5,384,041 discloses a vanadium trap for use in FCC which comprises a major amount of calcined kaolin clay, free magnesium oxide and an in-situ formed magnesium silicate cement binder.

U.S. Pat. Nos. 5,520,797 and 4,359,379 describe processes for the fluid catalytic cracking of heavy oils rich in Ni and V by withdrawing a portion of ferrite-containing catalyst particles circulating in a fluid catalytic cracking apparatus, by using a magnetic separator.

U.S. Pat. No. 5,603,823 discloses an additive composition containing Mg—Al oxide spinel with lanthanum and neodymium oxides.

U.S. Pat. No. 5,965,474 describes a catalytic composition for passivating metal contaminants in catalytic cracking of hydrocarbons with ultra-large pore crystalline material as an additive or catalyst composition. The metal passivator is incorporated within the pores of the large pore crystalline material. In a preferred embodiment, the metal passivator is a rare earth metal compound or an alkaline earth metal compound.

U.S. Pat. No. 5,993,645 disclose phosphorus treated cracking catalyst containing soda and phosphate with high tolerance to contaminant metals.

US 20070209969 provides a catalyst and a process for cracking heavy feedstocks employing a catalyst with one or more zeolites having controlled silica to alumina ratio.

U.S. Pat. No. 6,673,235 disclose a fluid catalytic cracking catalyst with transitional alumina phase formed within the microspheres to crack resid or resid-containing feeds.

U.S. Pat. No. 6,723,228 disclose an additive in the form of a solution, colloid, emulsion or suspension containing antimony, bismuth and combination of these.

EP0350280, disclose metals tolerant FCC catalyst system comprising an admixture of a LZ-210 type molecular sieve component and a bastnaesite type rare earth component dispersed in a large pore matrix containing substantial amounts of a large pore, low surface area alumina. This invention refers to a catalyst and process in which zeolite content is ranged from 10-50 wt % and rare earth component is present from 0.5-25-wt %. Referred formulation is a wholesome cracking catalyst having very high cracking functional zeolite component in range 10-50 wt %, which produces significant amount of catalytic coke.

From the various prior art processes and formulations for metal passivation in FCC process, it can be seen that rare earth based compounds have been used to mitigate the deleterious effects of metals especially that of vanadium and reduce the coke making tendencies of both nickel and vanadium for minimizing deleterious effects of vanadium contaminant vide using them as an integral part of FCC catalysts as can be seen in EP 0350280 and U.S. Pat. No. 4,515,683 and as rare earth based additive as disclosed in patents U.S. Pat. No. 5,304,299. The disadvantages on employing RFCC catalysts with inbuilt metal passivation components is the inflexibility to have metal passivation in the process as and when required while processing of feeds rich in metals. As the main unit catalyst inventory is large, dilution effects due to E-cat can be seen, even when the feed contains lesser amount of metal.

These disadvantages have been reported with the application of prior art additive. However, additives too suffer from dilution of main cracking catalyst. Higher the level of metals in the feed, higher the addition rate for metal passivation additive. As a result, employing additives beyond certain limits dilutes main host catalyst, thus lowering of conversion. Thus, there is a need for the development of an effective metal passivator additive, which can effectively passivate the metals and minimize the effect of dilution.

SUMMARY

The present invention relates to a metal passivator additive comprising 1 wt % to 50 wt % of a rare earth component; 5 wt % to 30 wt % of alumina; 10 wt % to 50 wt % of clay; 2 wt % to 15 wt % of colloidal silica; and 1 wt % to 10 wt % of a zeolite having high silica to alumina ratio.

The present invention also relates to a process for preparing a metal passivator additive, said process comprising preparing a rare earth slurry by mixing rare earth component with water in a ratio of 1:1 to 1:5; obtaining an alumina gel by treating alumina slurry with an acid in the range of 10 wt % to 30 wt % on volatile free basis of alumina, wherein the alumina slurry is prepared by mixing alumina and water in a ratio of 1:2 to 1:15; mixing the alumina gel and the rare earth slurry to obtain a slurry mixture; adding a colloidal silica to the slurry mixture; preparing a clay slurry by mixing clay and a dispersant in the range of 0.05 wt % to 2 wt % of clay; combining the clay slurry and the slurry mixture to obtain a rare earth-binder-filler slurry; obtaining an additive precursor slurry by mixing a zeolite having high silica to alumina ratio to the rare earth-binder-filler slurry; spray-drying the additive precursor slurry to obtain a spray-dried product; and calcining the spray-dried product at a temperature in the range of 450 degree C.-600 degree C. to obtain the metal passivator additive.

These and other features, aspects, and advantages of the present subject matter will become better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

DETAILED DESCRIPTION OF INVENTION

The present invention relates a metal passivator additive comprising: 1 wt % to 50 wt % of a rare earth component; 5 wt % to 30 wt % of alumina; 10 wt % to 50 wt % of clay; 2 wt % to 15 wt % of colloidal silica; and 1 wt % to 10, wt % of a zeolite having high silica to alumina ratio.

An embodiment of the present invention is a metal passivator additive, wherein the rare earth component comprises 80 wt % to 95 wt % of lanthanum oxide; 1 wt % to 20 wt % of cerium oxide, 0.1 wt % to 5 wt % of neodymium oxide; and 0.1 wt % to 5 wt % of praseodymium oxide.

Yet another embodiment of the present invention is a metal passivator additive, wherein the rare earth component has a surface area in the range of 10 $m^2/g$ to 150 $m^2/g$ and particle size in the range of 8 nm to 3000 nm.

Another embodiment of the present invention is a metal passivator additive, wherein the alumina is selected from the group consisting of pseudoboehmite alumina, gel alumina, bayerite and gamma alumina; or mixtures thereof.

Further embodiment of the present invention is a metal passivator additive, wherein the alumina has residual soda content less than 0.3 wt %.

Another embodiment of the present invention is a metal passivator additive, wherein the alumina has residual soda content in the range of 0.001 wt % to 0.3 wt %.

Still another embodiment of the present invention is a metal passivator additive, wherein the clay is selected from the group consisting of kaolin and halloysite; or mixtures thereof.

Another embodiment of the present invention is a metal passivator additive, wherein the colloidal silica has a mean diameter in the range of 4 nm to 100 nm.

Yet another embodiment of the present invention is a metal passivator additive, wherein the colloidal silica has residual soda content below 0.3 wt %.

Still another embodiment of the present invention is a metal passivator additive, wherein the zeolite is a hydrothermal stable zeolite.

Another embodiment of the present invention is a metal passivator additive, wherein the zeolite has silica to alumina ratio more than 8.

Further embodiment of the present invention is a metal passivator additive, wherein the zeolite is selected from the group consisting of USY-zeolite, ZSM-5, ZSM-11, mordenite and beta zeolite.

Yet another embodiment of the present invention is a metal passivator additive, wherein the zeolite is selected from USY zeolite with silica to alumina ratio more than 8, ZSM-5 and ZSM-11 zeolite with silica alumina ratio above 25, mordenite and beta zeolite with silica-to alumina ratio more than 20.

Still another embodiment of the present invention is a metal passivator additive, wherein the zeolite is selected from USY zeolite with silica to alumina ratio in the range of 8-90, ZSM-5 and ZSM-11 zeolite with silica alumina ratio in the range of 25-1000, mordenite and beta zeolite with silica-to alumina ratio in the range of 20-1000.

Another embodiment of the present invention is a metal passivator additive, wherein the zeolite is selected from the group consisting of protonated USY-zeolite, protonated ZSM-5, protonated ZSM-11, protonated mordenite, and protonated beta zeolite.

Still another embodiment of the present invention is a metal passivator additive, wherein the zeolite is selected from the group consisting of phosphated ZSM-5, phosphated ZSM-11, phosphated mordenite, and phosphated beta zeolite, wherein phosphate is present in the range of 0.1 wt % to 10 wt %.

Another embodiment of the present invention is a metal passivator additive having particle size in the range of 20 microns to 150 microns, an apparent bulk density in the range of 0.70 g/ml to 1 g/ml and an attrition index of a value below 10.

An embodiment of the present invention is a metal passivator additive for use in catalytic cracking of hydrocarbon, wherein the metal passivator additive is added in the range of 1 wt % to 30 wt % to a host cracking catalyst.

The present invention also relates to a process for preparing a metal passivator additive, said process comprising: preparing a rare earth slurry by mixing rare earth component with water in a ratio of 1:1 to 1:5; obtaining an alumina gel by treating alumina slurry with an acid in the range of 10 wt % to 30 wt % on volatile free basis of alumina, wherein the alumina slurry is prepared by mixing alumina and water in a ratio of 1:2 to 1:15; mixing the alumina gel and the rare earth slurry to obtain a slurry mixture; adding a colloidal silica to the slurry mixture; preparing a clay slurry by mixing clay and a dispersant in the range of 0.05 wt % to 2 wt % of clay; combining the clay slurry and the slurry mixture to obtain a rare earth-binder-filler slurry; obtaining an additive precursor slurry by mixing a zeolite having high silica to alumina ratio to the rare earth-binder-filler slurry; spray-drying the additive precursor slurry to obtain a spray-dried product; and calcining the spray-dried product at a temperature in the range of 450 degree C.-600 degree C. to obtain the metal passivator additive.

An embodiment of the present invention is a process for preparing a metal passivator additive, wherein the colloidal silica is acidified with an acid before adding to the rare earth-alumina gel slurry.

Another embodiment of the present invention is a process for preparing a metal passivator additive, wherein the acid is selected from the group consisting of hydrochloric acid, formic acid, nitric acid and acetic acid.

Further embodiment of the present invention is a process for preparing a metal passivator additive, wherein the rare earth component comprises: 80 wt % to 95 wt % of a lanthanum oxide, 1 wt % to 20 wt % of a cerium oxide, 0.1 wt % to 5 wt % of a neodymium oxide; and 0.1 wt % to 5 wt % of a praseodymium oxide.

Still another embodiment of the present invention is a process for preparing a metal passivator additive, wherein the rare earth component comprises 80 wt % to 95 wt % of lanthanum hydroxide, 1 wt % to 20 wt % of cerium hydroxide, 0.1 wt % to 5 wt % of neodymium hydroxide; and 0.1 wt % to 5 wt % of praseodymium hydroxide.

Yet another embodiment of the present invention is a process for preparing a metal passivator additive, wherein the rare earth component comprises 80wt % to 95 wt % of lanthanum carbonates, 1 wt % to 20 wt % of cerium carbonates, 0.1 wt % to 5 wt % of neodymium carbonates; and 0.1 wt % to 5 wt % of praseodymium carbonates.

Another embodiment of the present invention is a process for preparing a metal passivator additive, wherein the alumina is selected from the group consisting of pseudoboehmite alumina, gel alumina, bayerite and gamma alumina; or mixtures thereof.

Further embodiment of the present invention is a process for preparing a metal passivator additive, wherein the alumina has residual soda content in the range of 0.001 wt % to 0.1 wt %.

Still another embodiment of the present invention is a process for preparing a metal passivator additive, wherein the acid is selected from the group consisting of formic acid, acetic acid and nitric acid.

Yet another embodiment of the present invention is a process for preparing a metal passivator additive, wherein the colloidal silica has a mean diameter in the range of 4 nm to 100 nm.

Another embodiment of the present invention is a process for preparing a metal passivator additive, wherein the colloidal silica has residual soda content below 0.3 wt %.

Another embodiment of the present invention is a process for preparing a metal passivator additive, wherein the zeolite has silica to alumina ratio of more than 8.

Further embodiment of the present invention is a process for preparing a metal passivator additive, wherein the zeolite is selected from the group consisting of USY-zeolite, ZSM-5, ZSM-11, mordenite and beta zeolite.

Yet another embodiment of the present invention is a process for preparing a metal passivator additive, wherein the zeolite is selected from USY zeolite with silica to alumina ratio more then 8, ZSM-5 and ZSM-11 zeolite with silica alumina ratio more then 25, mordenite and beta zeolite with silica-to alumina ratio more then 20.

Further embodiment of the present invention is a process for preparing a metal passivator additive, wherein the zeolite is selected from USY zeolite with silica to alumina ratio in the range of 8-90, ZSM-5 and ZSM-11 zeolite with silica alumina ratio in the range of 25-1000, mordenite and beta zeolite with silica to alumina ratio in the range of 20-1000.

Still another embodiment of the present invention is a process for preparing a metal passivator additive, wherein the zeolite is selected from the group consisting of protonated USY-zeolite, protonated ZSM-5, protonated ZSM-11, protonated mordenite, and protonated beta zeolite.

Yet another embodiment of the present invention is a process for preparing a metal passivator additive, wherein the zeolite is selected from the group consisting of phosphated ZSM-5, phosphated ZSM-11, phosphated mordenite, and phosphated beta zeolite, wherein phosphate is present in the range of 0.1 wt % to 10 wt %.

Further embodiment of the present invention is a process for preparing a metal passivator additive, wherein the dispersant is selected from a group consisting of Zonyl TBS, Zonyl FSA and Tamol NN series.

An embodiment of the present invention is to provide an efficient metal passivation component suitable for developing a metal passivator additive.

Another embodiment of the present invention is to provide an additional efficient zeolite based cracking component having higher silica to alumina ratio, for compensating for activity loss.

Further embodiment of the present invention is to provide a process for binding both passivation and cracking components.

Still another embodiment of the present invention is a process for the preparation of a metal passivator additive, by which the developed additive has required physical properties to use along with a host cracking catalyst.

Yet another embodiment of the present invention is to develop a process for the preparation of a metal passivator additive, application of which reduces deleterious effects of metals such as vanadium and nickel on the host catalyst.

Further embodiment of the present invention is a process, by which application of additional component which is metal stable and compensates for the loss of activity of host catalyst due to dilution with additive.

Another embodiment of the present invention is a process for the preparation of a metal passivator additive, application of which enhances crystallinity and surface area of a host catalyst.

Yet another embodiment of the present invention is a process for the preparation of a metal passivator additive, wherein through enhanced crystallinity and surface area of host catalyst there is an increase in activity and selectivity of a host catalyst.

Another embodiment of the present invention is a process for the preparation of a metal passivator additive with adequate ABD and attrition resistance achieved through judicious application of suitable dispersant and nano size colloidal polysilicate for longer life of catalyst operation.

Components of the metal passivator additive are further described below on a component by component basis.

Rare Earth Component

The rare earth component of the present invention can be developed from rare earth based compounds such as rare earth chlorides, rare earth nitrates, rare earth oxalates, rare earth carbonates, rare earth acetates, rare earth formates, pure lanthanum chloride and pure lanthanum nitrate. The suitable rare earth component with tailor-made properties can be developed by precipitating lanthanum or mixed rare earth salts with ammonium hydroxide or sodium hydroxide under controlled pH and temperature. The prepared gels can be aged for a duration of a few minutes to hours and filtered and recovered as gel. The gel can be washed to minimize ions such as chloride, nitrate, acetate, formate and sodium. Further, the gel, once calcined, can have a surface area ranging from 10 $m^2/g$ to 150 $m^2/g$ with particles size ranging from 8 nm to 3,000 nm. The gel either in hydroxide form or in oxide form can be used either as a pure component or with suitable binders with clay as diluent for preparation of the metal passivator additive. Alternately, rare earth carbonate having lanthanum content over 70% can also be used.

Clay

The clay used in the present invention can be in finely divided form with size below 3 microns. The clay can include kaolinite and halloysite. Further, the clay has a two-layer structure having alternating sheets of silica in tetrahedral configuration and alumina in octahedral configuration. These sheets are separated with a gap of 7.13 angstrom. Further, dry atmosphere equilibrated clay having moisture content of about 15 wt % can also be used. It is advantageous to use heat processed clay preferably calcined in the temperature range from 250 degree C. to 500 degree C., for enhancing dispersion and solid content in final slurry.

Colloidal Silica

The colloidal silica used in the present invention can include aqueous colloidal dispersions of silica particles, stabilized by small quantities of sodium hydroxide or ammonium hydroxide. Further, the colloidal silica having soda content less than 0.4 wt % can be readily used. Typically, the colloidal silica is stable between pH of about 8.5 and 11. Colloidal silica is commercially available in varying particle size ranging from 7 nm to 80 nm. Colloidal silica employed in the present invention is added after acidification with an acid taken from the group of acids nitric acid, hydrochloric acid, formic acid and acetic acid. These acids break up polymeric silica species for occupation of void between major ingredients of additive such as clay, zeolite, alumina and rare earth oxide and improve ABD and attrition resistance property of final additive product.

Alumina

The pseudoboehmite alumina with soda content less than 0.1 wt % can be used as a binder for the metal passivator additive because the alumina can be converted into glue by reacting it with acids such as nitric acid, formic acid, or acetic acid. The alumina can have a crystallite size ranging from 3 nm to 30 nm. Efficacy of alumina binding can be enhanced through wet milling prior to gelation with an organic or mineral acid. Acids selected from formic, acetic, nitric can be employed for gelation. Glue alumina can be mixed with the rare earth component, clay, colloidal silica and zeolite and spray dried for producing the metal passivator additive. Further, the spray dried alumina is calcined and alumina present therein transformed into the gamma phase, which is used to hold other ingredients of the metal passivator additive together to form an attrition resistant mass. In yet another embodiment, other species of alumina, such as aluminum trihydrate, bayerite, or gamma alumina can also be used as filler for the metal passivator additive as these components enhance matrix property.

Zeolites

Large pore, high silica-alumina ratio zeolites with residual soda less than 0.8 wt % are preferred for incorporation into the additive formulation, especially for compensating activity loss. Generally in order to develop customized component, normal faujasite zeolite with residual soda about 13 wt % is repeatedly exchanged with a ammonium salt such ammonium sulphate, ammonium nitrate, ammonium chloride and ammonium acetate till residual soda is achieved below 3 wt %. Such zeolite is steamed in the temperature range 500 degree C.-700 degree C. for removing some of frame work aluminum, while surrounding silica will heal the vacancy at the site of dealumination, thus resulting in higher frame work silica-alumina ratio. Zeolite prepared by this way exhibit very high thermal stability over 850 degrees C. and are known as ultrastable zeolites. Care has to be taken to ensure to dislodge non-framework alumina; otherwise this will lead to non-selective cracking of hydrocarbon followed by dehydrogenation and ultimately leading to coke formation. For leaching out of alumina, mild acids such as citric, formic or acetic acids are preferred. Besides, mineral acids such as nitric acid, sulfuric acid, hydrochloric acid may also be used in diluted form at low temperature. Ready to use USY zeolite with low non-framework alumina are commercially available from Zeolyst with product code from CBV 500 to CBV 780. Other large pore zeolites such as mordenite, beta can also be employed as cracking component. For desired high selectivity of preferred products such as LPG, propylene beyond 30 wt % in LPG medium pore zeolites such as ZSM-5, ZSM-11 may additionally be loaded with phosphate in range of 0.1 wt % to 10 wt %.

EXAMPLES

The following examples are given by way of illustration of the present invention and should not be construed to limit the scope of present disclosure. It is to be understood that both the foregoing general description and the following detailed description are exemplary and explanatory only and are intended to provide further explanation of the subject matter.

Example 1

150.75 g of lanthanum oxide (loss on ignition 0.5 wt %) was slurried in 150 g of demineralised water (DM) and kept under stirring. 162.8 g of pseudoboehmite alumina was slurried in 710 g of DM water and kept under stirring, while 35.86 g of formic acid (85%) was added to obtain an alumina gel. The gel was added to the lanthanum oxide slurry under stirring. 83.3 g of acidified ammonium polysilicate (30 wt % $SiO_2$) was added to the lanthanum oxide-alumina gel slurry under stirring. Finally, 482 g of dispersed clay slurry having a solid content of 41.2 wt %, while Tamol dispersant was employed at@ 0.5 wt % was added to the lanthanum oxide-alumina gel-ammonium polysilicate slurry under stirring. The final slurry with a solid content of 35 wt % having composition: rare earth oxide 30 wt %, silica 5 wt %, alumina 25% and clay 40% was spray dried and the fraction between 20-105 microns with average particle size of 75 microns was separated for further study. The calcined product was tested for ABD and attrition index, which were measured respectively as 0.93 g/cc and 2.5%.

Example 2

100.0 g of lanthanum oxide (volatile free) was slurried in 100 g of demineralised water (DM) and kept under stirring. 129.77 g of pseudoboehmite alumina (LOI=23.9 wt %) was slurried in 568 g of DM water and kept under stirring, while 28.69 g of formic acid (85%) was added to obtain an alumina gel. The gel was added to the lanthanum oxide slurry under stirring. 83.3 g of ammonium polysilicate (30 wt % $SiO_2$) was added to the lanthanum oxide-alumina gel slurry under stirring. Finally, 687.5 g of well dispersed clay slurry having a solid content of 40 wt % prepared by employing 0.5 wt % of Tamol dispersant was added to the lanthanum oxide-alumina gel-ammonium polysilicate slurry under stirring. The final slurry with a solid content of 31 wt % with composition: rare earth oxide 20 wt %, silica 5 wt %, alumina 20 wt % and clay 55 wt % was spray dried and the fraction between 20-105 microns with average particle size of 75 microns was separated for further study. The calcined product was tested for ABD and attrition index, which were measured respectively as 0.89 g/cc and 3.2%. Reference base FCC catalyst (commercial product) and a 5 wt % blend of additive in base were doped with 8000 ppm of vanadium and 3500 ppm of nickel, by Mitchell method (Mitchell B. R., Industrial and Engineering Chemistry Product Research and Development, 19, 1980, P.209), employing naphthenates vanadium and nickel as metal source. The calcined blend was steam deactivated at 788 degree C. for three hours with 100% steam.

Steam deactivated samples were tested for physical properties along with fresh samples (Table 1). Performance evaluation of steam-deactivated catalysts was carried out with a RFCC feed (refer Table 2 for properties). Performance of the catalysts under identical severity or catalyst ratio is shown in Table 3.

Example 3

100.0 g of lanthanum oxide (volatile free) was slurried in 100 g of demineralised water (DM) and kept under stirring. 129.77 g of pseudoboehmite alumina (LOI=23.9 wt %) was slurried in 568 g of DM water and kept under stirring, while 28.69 g of formic acid (85%) was added to obtain an alumina gel. The gel was added to the lanthanum oxide slurry under stirring. 83.3 g of ammonium polysilicate (30 wt % SiO2) was added to the lanthanum oxide-alumina gel slurry under stirring. Finally, 561 g of well dispersed clay slurry having a solid content of 40 wt % prepared by employing 0.5 wt % of Tamol dispersant was added to the lanthanum oxide-alumina gel-ammonium polysilicate slurry under stirring, 56.82 gm USY zeolite (UCS, 24.4 A, crystallinity 80% and LOI=12 wt %) was milled with 90 gm of DM water. USY zeolite slurry was added to lanthanum oxide-alumina-ammonium polysilicate-clay slurry. The final slurry with a solid content of 31 wt % with composition: rare earth oxide 20 wt %, silica 5 wt %, alumina 20 wt %, clay 45 wt %, USY zeolite 10 wt % was spray dried and the fraction between 20-105 microns with average particle size of 75 microns was separated for further study. The calcined product was tested for ABD and attrition index, which were measured respectively as 0.85 g/cc and 3.0%. The performance of metal doped and steamed catalyst at 5 wt % concentration in base FCC catalyst, employing feed similar to that used for Catalyst of example 2 is shown in Table-3. Physico-chemical properties like surface area and crystallinity of composite samples of additive in base catalyst are shown in Table-1.

Example 4

166 g of lanthanum carbonate (loss on ignition 40 wt %) was slurried in 160 g of demineralised water (DM) and kept under stirring. 131.57 g of pseudoboehmite alumina (loss on ignition 24 wt %) was slurried in 568 g of DM water and kept under stirring, while 28.69 g of formic acid (85%) was added to obtain an alumina gel. The gel was added to the lanthanum carbonate slurry under stirring. 83.3 g of ammonium polysilicate (30 wt % $SiO_2$) was added to the lanthanum carbonate-alumina gel slurry under stirring. To the lanthanum carbonate-alumina-polysicate slurry was added under stirring 546.11 g of well dispersed clay slurry having a solid content of 41.2 wt % prepared by employing 0.5 wt % of Tamol dispersant. Finally, 56.82 gm USY zeolite (UCS, 24.4 A°, crystallinity 80%, and LOI is 12 wt %) was milled with 90 gm of DM water. USY zeolite slurry was added to lanthanum carbonate-alumina-ammonium polysilicate-clay slurry. The final slurry with a solid content of about 30 wt % and composition: rare earth oxide 20 wt %, silica 5 wt %, alumina 20 wt %, clay 45 wt %, USY zeolite 10 wt % was spray dried and the fraction between 20-105 microns with average particle size of 75 microns was separated for further study. The calcined product was tested for ABD and attrition index, which were measured respectively as 0.81 g/cc and 3.5%. The performance of metal doped and steam impregnated catalyst at 5 wt % concentration in base FCC catalyst, employing feed similar to that used for Catalyst of example 2 is shown in Table-3. Physico-chemical properties like surface area and crystallinity of composite samples of additive in base catalyst are shown in Table-1.

Example 5

167 g of lanthanum carbonate (loss on ignition 40 wt %) was slurried in 160 g of demineralised water (DM) and kept under stirring. 131.57 g of pseudoboehmite alumina (loss on ignition 24 wt %) was slurried in 568 g of DM water and kept under stirring, while 28.69 g of formic acid (85%) was added to obtain an alumina gel. The gel was added to the lanthanum carbonate slurry under stirring. 83.3 g of ammonium polysilicate (30 wt % $SiO_2$) was added to the lanthanum carbonate-alumina gel slurry under stirring. To the lanthanum carbonate-alumina gel-polysilicate slurry was added under stirring 546.11 g of well dispersed clay slurry having a solid content of 41.2 wt % prepared by employing 0.5 wt % of Tamol dispersant. Finally, 57.5 gm HZSM-5 zeolite ($SiO_2/Al_2O_3$ ratio 30 and LOI=13 wt %) was milled with 95 gm of DM water. ZSM-5 zeolite slurry was added to lanthanum carbonate-alumina gel-ammonium polysilicate-clay slurry. The final slurry with a solid content of about 30 wt % and composition: rare earth oxide 20 wt %, silica 5 wt %, alumina 20 wt %, clay 45 wt %, ZSM-5 zeolite 10 wt % was spray dried and the fraction between 20-105 microns with average particle size of 75 microns was separated for further study. The calcined product was tested for ABD and attrition index, which were measured respectively as 0.83 g/cc and 3.4%. The performance of metal. doped and steam catalyst at 5wt % concentration in base FCC catalyst, employing feed similar to that used for Catalyst of example2 is shown in Table-3. A similar catalyst was prepared with identical composition and procedure except, ZSM-5 zeolite employed contained 5 wt % of PO4. The performance of this product is shown in adjacent column in Table-3. Physico-chemical properties like surface area and crystallinity of composite samples of additive in base catalyst are shown in Table-1.

Example 6

This example is for demonstrating the performance of FCC catalyst prepared from LZY 210 zeolite.

243 g of pseudoboehmite alumina (loss on ignition 23 wt %) was slurried in 692 g of DM water and kept under stirring, while 53.75 g of formic acid (85%) was added to obtain an alumina gel. The gel was added to 455 g of well dispersed clay slurry having a solid content of 41.2 wt % prepared by employing 0.5 wt % of Tamol dispersant. To the lanthanum carbonate slurry under stirring, 229 gm of USY zeolite (LOI 19.22) was slurried in 471 g of DM water and milled for 30 minutes and added under stirring to alumnia gel-clay slurry. 250 g of lanthanum carbonate (loss on ignition 40 wt %) was slurried in 400 g of demineralised water (DM) and added under stirring to alumina gel-clay-USY zeolite slurry. Finally, 125 g of ammonium polysilicate (30 wt % $SiO_2$) was added under stirring to alumina gel-clay-USY-rare earth carbonate for obtaining fine catalyst precursor slurry. The final slurry with a solid content of about 30 wt % and composition: alumina 25. %, clay 25 wt %, rare earth oxide 20 wt %, silica 5 wt %, USY 25 wt % was spray dried and the fraction between 20-105 microns with average particle size of 75 microns was separated for further study. The calcined product was tested for ABD and attrition index, which were measured respectively as 0.8 g/cc and 5%. The performance of metal doped and steamed 100% catalyst, employing feed similar to that used for Catalyst of example 2 is catalyst is shown in Table-3.

It is evident from table 3 that the performance of the metal passivator additive of the present invention is better than the performance of the FCC catalyst prepared from LZY 210 zeolite of example 6.

The properties of feed used for testing performance of metal passivator additive are shown in Table-2.

Physico-chemical properties like surface area and crystallinity of composite samples of additive in base catalyst are shown in Table-1.

TABLE 1

Physico-chemical properties of composite samples of additive in base catalyst

| Catalyst | Surface area, m²/g | | X-ray crystallinity, % | |
|---|---|---|---|---|
| | Fresh | Steamed | Fresh | Steamed |
| Reference | 250 | 64 | 20.8 | 6.5 |
| 95% base + 5 wt % Example-2 | 245 | 110 | 20.6 | 7.1 |
| 95% base + 5 wt % Example-3 | 247 | 113 | 21.6 | 8.5 |
| 95% base + 5 wt % Example-4 | 248 | 118 | 21.5 | 9.1 |
| 95% base + 5 wt % Example-5 | 246 | 114 | 20.3 | 7.9 |
| 100% of catalyst of Example-6 | 230 | 97 | 19.4 | 6.3 |

TABLE 2

Properties of RFCC feed used for testing performance of metal passivator additive samples.

| Property | Test result |
|---|---|
| Density at 15 deg.C., g/ml (Test Method IP 190) | 0.9387 |
| Kinematic viscosity,cSt at 100 deg. C., (Test Method ASTM D445) | 12.69 |
| CCR, % wt (Test Method ASTM D189) | 4.0 |
| Boiling Range, % vol at deg. C., (Test Method ASTM D1160) | |
| IBP | 318 |
| 5 | 345 |
| 10/20 | 353/370 |
| 30/40 | 416/436 |
| 50/60 | 458/490 |
| 70/80 | 537/577 |
| 90/95 | — |
| FBP | — |
| Hydrocarbon Composition: | |
| Aromatics % wt | 45.2 |
| Saturates, % wt | 54.8 |
| Aromatic Ring Carbon, % wt | 23.02 |
| Paraffinic Ring Carbon, % wt | 58.34 |
| Naphthenic Ring Carbon, % wt | 18.64 |
| Sulfur Content, % wt | 3.24 |
| Metal Contaminants: | |
| Ni, ppm | 9 |
| V, ppm | 15 |

TABLE 3

Performance data of catalyst under additive of example 3, 4 and 5 comparative reference catalyst of example 2 and 6 along with base catalyst.

| | Base | Base + Catalyst of example-2 (5 wt %) | Base + Catalyst of example-2, (7.5 wt %) | Base + Catalyst of example-2, (10 wt %) | Base + Catalyst of example-3 (5 wt %) | Base + Catalyst of example-4 (5 wt %) | Base + Catalyst of example-5 (5 wt %) | Catalyst of example-6 |
|---|---|---|---|---|---|---|---|---|
| Cat/Oil | 4.51 | 4.51 | 4.51 | 4.51 | 4.51 | 4.51 | 4.51 | 4.51 |
| Temperature, deg. C. | 510 | 510 | 510 | 510 | 510 | 510 | 510 | 510 |
| Yield, wt % | | | | | | | | |
| Dry gas | 2.66 | 2.93 | 2.71 | 2.65 | 2.92 | 2.89 | 3.32 | 3.98 |
| LPG | 11.95 | 13.71 | 12.02 | 11.95 | 13.37 | 13.39 | 14.77 | 12.13 |
| Gasoline | 28.01 | 31.17 | 25.6 | 23.5 | 32.07 | 32.21 | 31.07 | 27.73 |
| Heavy naphtha | 12.98 | 13.25 | 13.15 | 12.52 | 13.79 | 13.52 | 12.96 | 13.41 |
| LCO | 24.33 | 21.85 | 23.53 | 24.77 | 21.90 | 22.08 | 21.82 | 22.17 |
| CLO | 13.26 | 9.48 | 15.02 | 17.73 | 8.46 | 8.51 | 8.81 | 11.21 |
| Coke | 6.81 | 7.61 | 7.97 | 6.88 | 7.49 | 7.4 | 7.23 | 9.36 |
| Conversion, wt % | 62.41 | 68.67 | 61.45 | 57.5 | 69.64 | 69.41 | 69.35 | 66.61 |

* Propylene in LPG 39 wt %

ADVANTAGES OF THE INVENTION

The previously described versions of the subject matter and its equivalent thereof have many advantages, including those which are described as:
1. The present invention describes a process for the preparation and use of a metal passivator additive based on rare earth oxides and high silica to alumina ratio zeolite, which offers higher flexibility when compared to the existing cracking catalysts that have the passivation component as their integral part.
2. The metal passivator additive of present invention can be used while processing metal laden feeds and addition can be terminated while processing lighter feeds with negligible metals.
3. Further, the metal passivator additive of present invention provides high passivation for metals while meeting required physical properties such as apparent bulk density (ABD) and attrition index (AI).
4. Further, the metal passivator additive of present invention enhances crystallinity and surface area of a host catalyst.
5. Further, the metal passivator additive of present invention increases activity and selectivity of a host catalyst.

Although the subject matter has been described in considerable detail with reference to certain preferred embodiments thereof, other embodiments are possible. As such, the spirit and scope of the appended claims should not be limited to the description of the preferred embodiment contained therein.

The invention claimed is:

1. A metal passivator additive comprising:
   1 wt % to 50 wt % of a rare earth component;
   5 wt % to 30 wt % of alumina;
   10 wt % to 50 wt % of clay;
   2 wt % to 15 wt % of colloidal silica; and
   1 wt % to 10 wt % of a zeolite having silica to alumina ratio of more than 8.

2. The additive as claimed in claim 1, wherein the rare earth component comprises:
   80 wt % to 95 wt % of lanthanum oxide;
   1 wt % to 20 wt % of cerium oxide;
   0.1 wt % to 5 wt % of neodymium oxide; and
   0.1 wt % to 5 wt % of praseodymium oxide.

3. The additive as claimed in claim 1, wherein the rare earth component has a surface area in the range of 10 $m^2$/g to 150 $m^2$/g and particle size in the range of 8 nm to 3000 nm.

4. The additive as claimed in claim 1, wherein the alumina is selected from the group consisting of pseudoboehmite alumina, gel alumina, bayerite and gamma alumina; or mixtures thereof.

5. The additive as claimed in claim 1, wherein the alumina has residual soda content in the range of 0.001 wt % to 0.3 wt %.

6. The additive as claimed in claim 1, wherein the clay is selected from the group consisting of kaolin and halloysite; or mixtures thereof.

7. The additive as claimed in claim 1, wherein the colloidal silica has a mean diameter in the range of 4 nm to 100 nm.

8. The additive as claimed in claim 1, wherein the colloidal silica has residual soda content below 0.3 wt %.

9. The additive as claimed in claim 1, wherein the zeolite is selected from the group consisting of USY-zeolite, ZSM-5, ZSM-11, mordenite, beta zeolite, protonated USY-zeolite, protonated ZSM-5, protonated ZSM-11, protonated mordenite, protonated beta zeolite, phosphate ZSM-5, phosphate ZSM-11, phosphate mordenite, and phosphate beta zeolite, wherein phosphate is present in the range of 0.1 wt % to 10 wt %.

10. The metal passivator additive as claimed in any one of the claims 1 to 8, and 9, having particle size in the range of 20 microns to 150 microns, an apparent bulk density in the range of 0.70 g/ml to 1 g/ml and an attrition index of a value below 10.

11. The metal passivator additive as claimed in any one of the claims 1 to 8, 9, and 10 for use in catalytic cracking of hydrocarbon, wherein the metal passivator additive is added in the range of 1 wt % to 30 wt % to a host cracking catalyst.

12. A process for preparing a metal passivator additive comprising 1 wt % to 50 wt % of a rare earth component; 5 wt % to 30 wt % of alumina; 10 wt % to 50 wt % of clay; 2 wt % to 15 wt % of colloidal silica; and 1 wt % to 10 wt % of a zeolite having silica to alumina ratio of more than 8, said process comprising:
   preparing a rare earth slurry by mixing rare earth component with water in a ratio of 1:1 w/v to 1:5 w/v;

obtaining an alumina gel by treating alumina slurry with an acid in the range of 10 wt % to 30 wt % on volatile free basis of alumina, wherein the alumina slurry is prepared by mixing alumina and water in a ratio of 1:2 w/v to 1:15 w/v;

mixing the alumina gel and the rare earth slurry to obtain a slurry mixture;

adding a colloidal silica to the slurry mixture;

preparing a clay slurry by mixing clay and a dispersant in the range of 0.05 wt % to 2 wt % of clay;

combining the clay slurry and the slurry mixture to obtain a rare earth-binder-filler slurry;

obtaining an additive precursor slurry by mixing a zeolite having high silica to alumina ratio to the rare earth-binder-filler slurry;

spray-drying the additive precursor slurry to obtain a spray-dried product; and calcining the spray-dried product at a temperature in the range of 450 degree Celsius-600 degree Celsius to obtain the metal passivator additive.

13. The process as claimed in claim 12, wherein the colloidal silica is acidified with an acid before adding to the rare earth-alumina gel slurry, wherein the acid is selected from the group consisting of hydrochloric acid, formic acid, nitric acid and acetic acid.

14. The process as claimed in claim 12, wherein the rare earth component comprises:
   80 wt % to 95 wt % of a lanthanum oxide or lanthanum hydroxide or lanthanum carbonates;
   1 wt % to 20 wt % of a cerium oxide or cerium hydrooxide or cerium carbonates;
   0.1 wt % to 5 wt % of a neodymium oxide or neodymium hydrooxide or neodymium carbonates; and
   1 wt % to 5 wt % of a praseodymium oxide or praseodymium hydroxide or praseodymium carbonates.

15. The process as claimed in claim 12, wherein the acid is selected from the group consisting of formic acid, acetic acid and nitric acid.

* * * * *